United States Patent
Cheng

(10) Patent No.: US 6,464,901 B1
(45) Date of Patent: *Oct. 15, 2002

(54) HALOGEN RESISTANT COPPER CORROSION INHIBITORS

(76) Inventor: Longchun Cheng, 43 Manley Rd., Hopewell Township, NJ (US) 08638

(*) Notice: Subject to any disclaimer, the term of this patent is extended or adjusted under 35 U.S.C. 154(b) by 0 days.

This patent is subject to a terminal disclaimer.

(21) Appl. No.: 09/565,397

(22) Filed: May 5, 2000

Related U.S. Application Data

(63) Continuation of application No. 09/291,154, filed on Apr. 12, 1999, now Pat. No. 6,103,144.

(51) Int. Cl.[7] .................................................. C09K 3/00
(52) U.S. Cl. ....................... 252/394; 252/387; 252/388; 252/390; 422/7; 422/12; 422/13; 422/14; 148/282
(58) Field of Search ................................ 252/394, 387, 252/388, 390; 422/7, 12, 13, 14; 148/282

(56) References Cited

U.S. PATENT DOCUMENTS

| | | |
|---|---|---|
| 4,107,060 A | 8/1978 | Schick et al. |
| 4,184,991 A | 1/1980 | Scheurman, III |
| 4,642,221 A | 2/1987 | Hansen et al. |
| 4,744,950 A | 5/1988 | Hollander |
| 5,141,675 A | 8/1992 | Vanderpool et al. |
| 5,217,686 A | 6/1993 | Vanderpool et al. |
| 5,294,519 A | 3/1994 | Mori et al. |
| 5,411,677 A | 5/1995 | Pickering et al. |
| 5,689,879 A | 11/1997 | Urasaki et al. |
| 5,772,919 A | 6/1998 | Reichgott et al. |
| 5,773,627 A | 6/1998 | Anderson et al. |

FOREIGN PATENT DOCUMENTS

| | | |
|---|---|---|
| JP | 53-18432 | 2/1978 |

*Primary Examiner*—Jill Warden
*Assistant Examiner*—Monique T. Cole
(74) *Attorney, Agent, or Firm*—Steven D. Boyd

(57) ABSTRACT

Non-halogen substituted, nitrogen containing, aromatic compounds are disclosed which are effective copper corrosion inhibitors in aqueous systems being treated with a halogen biocide. The materials of the present invention exhibit copper corrosion inhibition comparable to tolyltriazole in the absence of halogen, copper corrosion rates of less than about 2.5 mills per year in aqueous systems where halogen is present; and do not exhibit a detrimental effect on halogen demand in an aqueous system being treated.

2 Claims, 3 Drawing Sheets

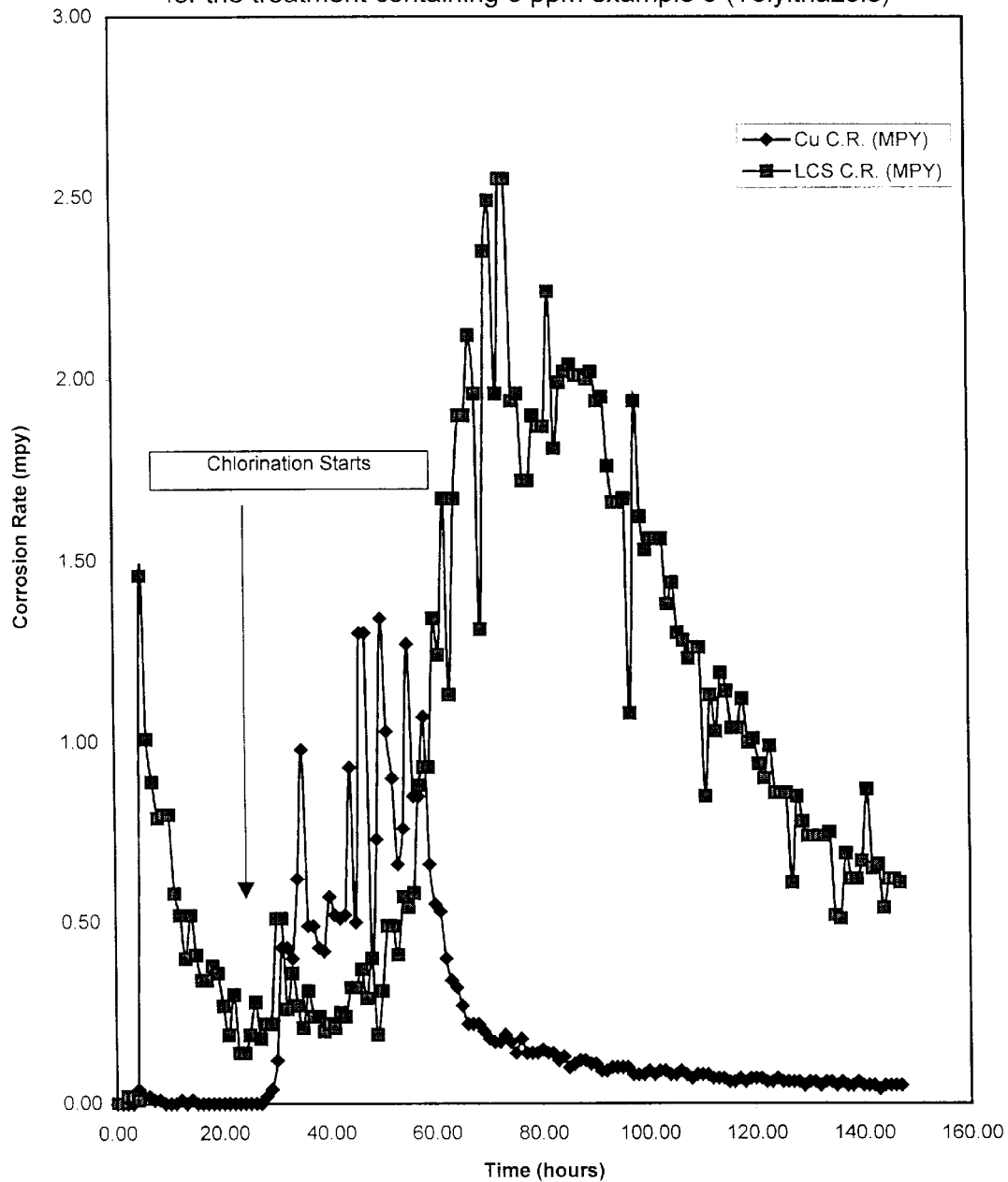

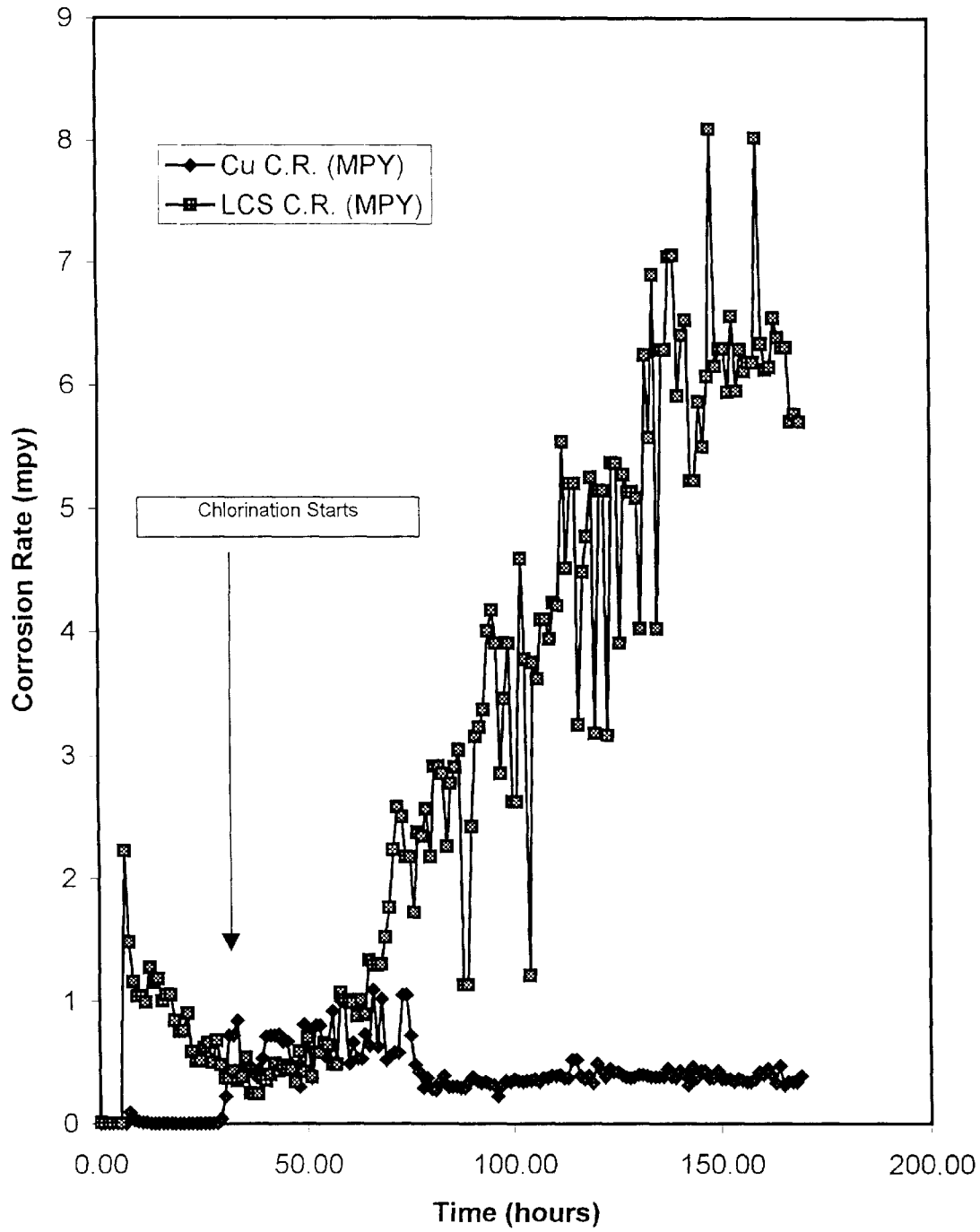
Figure 2. Low carbon steel and copper corrosion rate for the treatment containing 3 ppm example 10 (4,7-dimethylbenzotriazole)

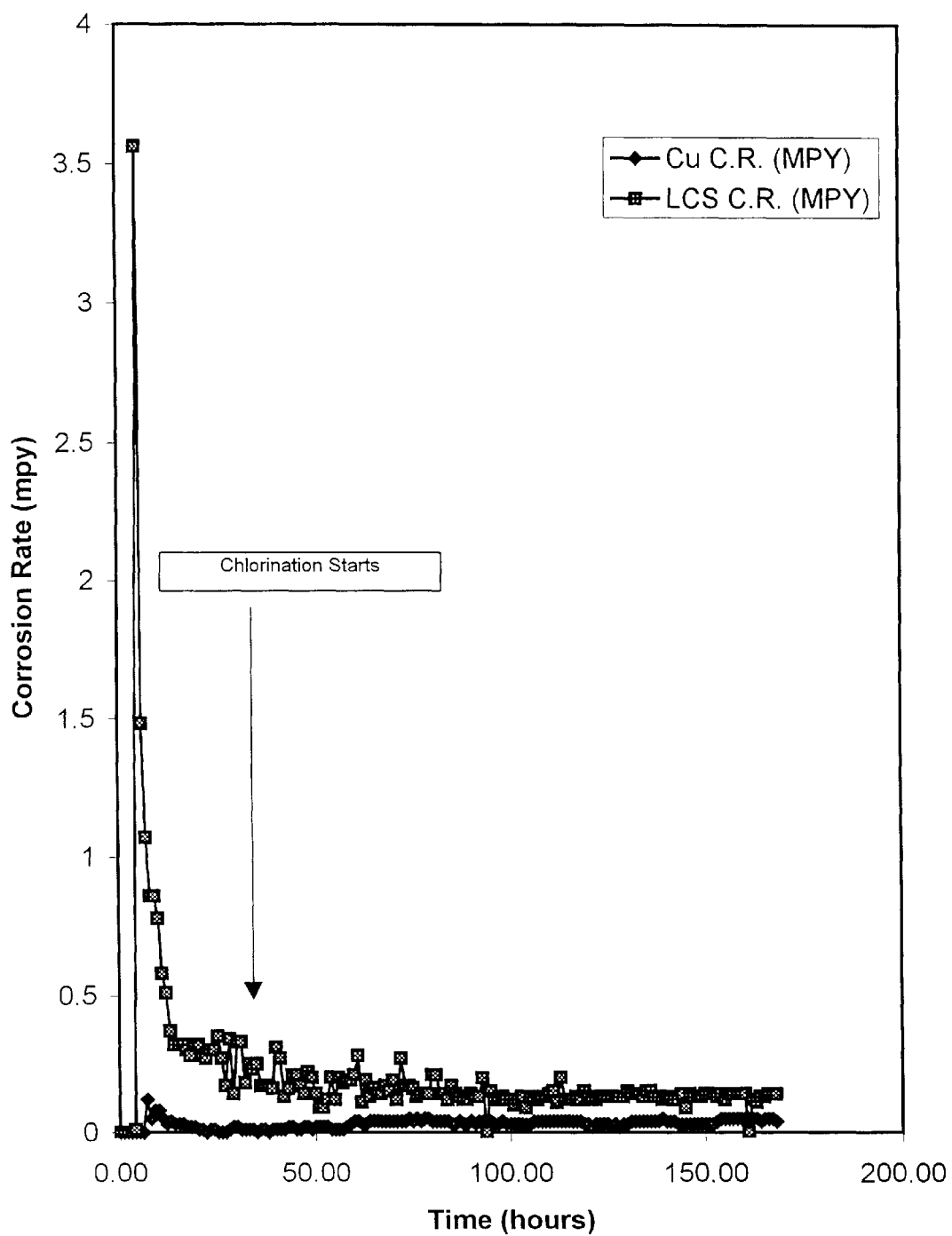
Figure 3. Low carbon steel and copper corrosion rate for the treatment containing 3 ppm example 19 (5-benzylbenzotriazole)

HALOGEN RESISTANT COPPER CORROSION INHIBITORS

This is a continuation of application Ser. No. 09/291,154 filed Apr. 12, 1999 now U.S. Pat. No. 6,103,144, issued Aug. 15, 2000.

SUMMARY OF THE INVENTION

The present inventor has discovered that there exists non-halogenated, substituted aromatic materials that are effective corrosion inhibitors in aqueous systems in the presence of halogen. The halogen resistant corrosion inhibitors of the present invention are at least as effective as tolyltriazole in the absence of halogen, are effective in the presence of halogen and do not materially affect the halogen demand of an aqueous system being treated.

BACKGROUND OF THE INVENTION

The use of triazoles for inhibiting the corrosion of copper and iron alloys in a wide variety of aqueous systems is well known. In industrial cooling water systems, benzotriazole and tolyltriazole are used most often. Tolyltriazole is generally preferred because of its lower cost. Triazoles are film forming materials that provide efficient coverage of metal or metal oxide surfaces in a system thereby providing protection against corrosive elements present in an aqueous system. In addition to the film forming tendency of various azoles, they also precipitate soluble, divalent copper ions. The precipitation of copper ions prevents the transport of copper ions to ferrous surfaces, where galvanic reactions between copper ions and iron atoms leads to pitting corrosion of the ferrous metal.

While the use of azoles for corrosion inhibition is widespread, there are drawbacks to their use, specifically with tolyltriazole. The most important drawbacks are experienced when azoles are used in combination with oxidizing halogen biocides. Oxidizing halogens such as elemental chlorine, bromine, their hypohalous acids, or their alkaline solutions (i.e., solutions of hypochlorite or hypobromite ions) are the most common materials used to control microbiological growth in cooling water systems. When copper or iron alloys that have been previously protected with azoles are exposed to an oxidizing halogen, corrosion protection breaks down. After breakdown, it is difficult to form new protective films in tolyltriazole treated systems that are being halogenated, particularly continuously halogenated. Very high dosages of tolyltriazole are frequently applied in an attempt to improve performance, often with limited success.

The degradation of protection of azole films in the presence of oxidizing halogens is well documented in the literature. For example, U.S. Pat. No. 5,772,919 discloses the use of halo-benzotriazoles as corrosion inhibitors in aqueous systems. The halo-benzotriazoles disclosed in U.S. Pat. No. 5,772,919 were found to be effective in the presence of chlorine.

U.S. Pat. No. 4,642,221 discloses the use of aromatic triazoles such as benzene triazole and derivatives of benzotriazoles such as alkyl-substituted triazoles in combination with an imino compound to control corrosion in aqueous systems.

U.S. Pat. No. 4,184,991 discloses a composition and method of inhibiting corrosion of ferrous metals comprising treatment of aqueous systems with an admixture of a benzotriazole, a tolyltriazole, a substituted benzotriazole or a substitute tolyltriazole with an acrylic or methacrylic acid ester polymer.

U.S. Pat. No. 5,217,686 discloses a corrosion inhibitor which comprises an alkoxybenzotriazole in combination with mercaptobenzothiazole, tolyltriazole, benzotriazole, a substituted benzotriazole and/or 1-phenyl-5-mercaptotetrazole.

U.S. Pat. No. 5,141,675 discloses a corrosion inhibitor comprising a polyphosphate in combination with an azole such as an alkyl or alkoxy benzotriazole, mercaptobenzothiazole, tolyltriazole, benzotriazole, a substituted benzotriazole and/or 1-phenyl-5-mercaptotetrazole.

BRIEF DESCRIPTION OF THE DRAWINGS

FIG. 1 is a graph of corrosion rate (mpy) vs. time (hours) for a treatment comprising tolyltriazole.

FIG. 2 is a graph of corrosion rate (mpy) vs. time (hours) for a treatment comprising 4,7-dimethylbenzotriazole.

FIG. 3 is a graph of corrosion rate (mpy) vs. time (hours) for a treatment comprising 5-benzylbenzotriazole.

DESCRIPTION OF THE PREFERRED EMBODIMENTS

The present inventor has discovered that there exists non-halogenated, nitrogen containing, aromatic compounds that are effective copper corrosion inhibitors for aqueous systems being treated with halogen. The corrosion inhibiting materials of the present invention are those nitrogen containing, aromatic compounds which provide copper corrosion inhibition in aqueous systems comparable to tolyltriazole in the absence of halogen; copper corrosion of less than about 2.5 mills per year in aqueous systems where halogen is present; and do not exhibit a detrimental effect on halogen demand in the system being treated. The nitrogen containing, aromatic compounds which were found to be effective copper corrosion inhibitors in the presence of halogen in an aqueous system did not fall within any readily discernable chemical class. Accordingly, those materials which meet this criteria shall hereinafter be classified as "halogen resistant copper corrosion inhibitors" (HRCCI).

The present inventor has developed a unique combination of test procedures, by which the artisan can readily discern which non-halogenated, nitrogen containing, aromatic compounds are HRCCI's. The present inventor has discovered that HRCCI materials, exemplified by the non-halogenated, nitrogen containing, aromatic materials described below, provide effective, halogen resistant corrosion inhibition in aqueous system being treated with halogen.

The present inventor has discovered that providing substitution for one or more of the hydrogens of the benzene ring of an azole can provide for a filming corrosion inhibitor which is resistant to oxidizing biocide degradation in aqueous systems. The present inventor found that efficacy as a halogen resistant copper corrosion inhibitor could not be predicted based upon the type, or isomeric position of the substituted moiety. The present inventor found that non-halogenated, nitrogen containing, aromatics which met four easily tested criteria were effective corrosion inhibitors in aqueous systems being treated with halogen. The four criteria are: (a) an 18 hour average corrosion rate for copper of less than about 0.3 mills per year in the absence of halogen; (b) a 22 hour average corrosion rate for copper of less than about 2.5 mills per year in the presence of 5 parts per million halogen; and (c) a free chlorine concentration of at least about 4.0 ppm at 19 hours when an initial chlorine concentration of 5 parts per million is provided; and (d) free chlorine concentration of at least about 2.0 parts per million after 40 hours when an initial chlorine concentration of 5 parts per million is provided.

Upon testing of a significant number of substituted benzotriazole, benzoxazole and benzimidazole materials, it was discovered that a surprisingly few would meet this four part "test" and provide for corrosion efficacy comparable to tolyltriazole in halogenated aqueous systems.

In treating an aqueous system with the HRCCI materials of the present invention, HRCCI is preferably fed continuously to the water. A preferred treatment concentration ranges from about 0.2 to 10 parts per million. Continuous feed is not, however, a requirement. The HRCCI materials can be fed at a concentration sufficient to form a protective film and thereafter feed can be discontinued for extended periods of time.

The HRCCI materials of the present invention may be employed in combination with other conventional water treatment materials, including different corrosion inhibitors, as well as surfactants, scale inhibitors, dispersants, pH adjusters and the like.

The present invention will now be further described with reference to a number of specific examples which are to be regarded solely as illustration and not as restricting the scope of the present invention.

EXAMPLE 1

Corrosion inhibition activity of non-halogen substituted nitrogen containing, aromatic compounds were first evaluated using a Beaker Corrosion Test Apparatus (BCTA). The BCTA consisted of a beaker equipped with an air/$CO_2$ sparge, a copper electrochemical probe, and a magnetic stirrer. The test solution was 1.9 liters. Air/$CO_2$ sparging was continuous during the test. The reference electrode and the counter electrode were constructed of Hastelloy C22. The beaker was immersed in a water bath for temperature control. Electrochemical corrosion data were obtained periodically on the probe during the test using a polarization resistance technique. All tests were conducted at 120° F., using a 400 rpm stir rate.

For all BCTA tests, a water consisting of 500 ppm Ca (as $CaCO_3$), 250 ppm Mg (as $CaCO_3$), 354 ppm chloride, and 240 ppm sulfate was used. The system pH was controlled at 7.2 with the targeted alkalinity being 15 ppm as $CaCO_3$. In addition to the azole and substituted azole materials tested for copper corrosion inhibition, the following aqueous system treatments were also used; 15 ppm ortho-$PO_4$ (as $PO_4$); 3 ppm $P_2O_7$ (as $PO_4$) and 10 ppm of HPS-I (a copolymer of acrylic acid and allylhydroxypropylsulfonate ether sodium salt).

Copper probes were immersed in the test water containing various substituted azole materials for about 18 hours. As the corrosion rate stabilized, bleach solution (NaOCl, the source of chlorine) was shot-fed into the test water. The test was continued for another 22 hours. Corrosion rates of copper were measured periodically during the 40-hour test. The changes in corrosion rates after bleach feed are an indicator for the efficacy of the tested materials under chlorination conditions. After feeding the bleach solution (5 ppm as chlorine) at the 18th hour, free chlorine concentration in the system was analyzed at the 19th, 20th, 21st, 22nd, 23rd and 40th hour using a DPD method. Table I summarizes the data.

The data from Table I was evaluated under the four step criteria for HRCCI functionality of the present invention. The four step criteria is: Step 1: An 18 hour average corrosion rate for copper of less than about 0.3 mills per year in the absence of halogen. Step 2: A 22 hour average corrosion rate for copper of less than about 2.5 mills per year in the presence of 5 parts per million halogen. Step 3: Free chlorine concentration of at least about 4.0 parts per million at 19 hours when an initial halogen concentration of 5 parts per million is provided. Step 4: Free chlorine concentration of at least about 2.0 parts per million at 40 hours when an initial halogen concentration of 5 parts per million is provided.

Table II summarizes the results of the four-part evaluation for the materials tested.

TABLE I

| INHIBITOR | Avg. C.R. (mpy) 0–18 hrs | Avg. C.R. (mpy) 18–40 hrs | Free Cl2 @ 19th hr | Free Cl2 @ 20th hr | Free Cl2 @ 21st hr | Free Cl2 @ 22nd hr | Free Cl2 @ 23rd hr | Free Cl2 @ 40th hr |
|---|---|---|---|---|---|---|---|---|
| Blank | 0.333 | 3.876 | 4.81 | 4.76 | 4.63 | 4.49 | 4.30 | 1.90 |
| Benzotriazole | 0.021 | 2.593 | 4.84 | 4.78 | 4.70 | 4.61 | 4.45 | 2.85 |
| Tolyltriazole | 0.017 | 2.762 | 4.72 | 4.60 | 4.51 | 4.44 | 4.28 | 2.74 |
| 2-(5-Amino-pentyl)-benzotriazoie | 0.039 | 3.185 | 2.07 | 1.90 | 1.65 | 1.37 | 1.18 | 0.07 |
| 2-Amino-5-chloro-benzoxazole | 0.028 | 0.024 | 0.35 | 0.13 | 0.13 | 0.13 | 0.13 | 0.04 |
| 2-Butyl-5,6-dichloro-benzimidazole | 0.046 | 4.479 | 4.40 | 4.20 | 4.08 | 3.93 | 3.88 | 2.18 |
| 2-Methyl-5,6-(methylenedioxy)-benzimidazole | 0.108 | 0.455 | 0.60 | 0.33 | 0.15 | 0.13 | 0.13 | 0.03 |
| 4,5,6,7-Tetramethyl-benzotriazole | 0.010 | 1.068 | 3.35 | 2.55 | 1.65 | 0.68 | 0.45 | 0.03 |
| 4,7-Dimethyl-benzotriazole | 0.007 | 3.156 | 4.35 | 4.10 | 3.90 | 3.68 | 3.50 | 1.10 |
| 4-Sulfonic acid-benzotriazole | 0.162 | 4.855 | 4.90 | 4.75 | 4.65 | 4.40 | 4.23 | 2.29 |
| 5,6-Benzo-benzotriazole | 0.022 | 2.528 | 4.55 | 4.18 | 4.08 | 3.90 | 3.80 | 1.50 |
| 5,6-Dichloro-2-methyl-benzimidazole | 0.038 | 5.941 | 4.23 | 4.20 | 4.00 | 3.78 | 3.65 | 1.88 |
| 5,6-Dichloro-4,7-dimethyl-benzotriazole | 0.029 | 4.715 | 4.50 | 4.25 | 4.05 | 3.98 | 3.80 | 1.93 |
| 5,6-Dichloro-benzimidazole | 0.020 | 8.079 | 4.65 | 4.58 | 4.45 | 4.32 | 4.23 | 2.13 |
| 5,6-Dimethyl-benzotriazole | 0.021 | 0.485 | 4.55 | 4.55 | 4.38 | 4.33 | 4.25 | 3.15 |

TABLE I-continued

| INHIBITOR | Avg. C.R. (mpy) 0–18 hrs | Avg. C.R. (mpy) 18–40 hrs | Free Cl2 @ 19th hr | Free Cl2 @ 20th hr | Free Cl2 @ 21st hr | Free Cl2 @ 22nd hr | Free Cl2 @ 23rd hr | Free Cl2 @ 40th hr |
|---|---|---|---|---|---|---|---|---|
| 5,6-Diphenyl-benzotriazole | 0.018 | 0.016 | 4.58 | 4.50 | 4.43 | 4.40 | 4.30 | 3.73 |
| 5-Benzoyl-benzotriazole | 0.026 | 0.041 | 4.58 | 4.58 | 4.53 | 4.48 | 4.48 | 3.70 |
| 5-Benzyl-benzotriazole | 0.008 | 0.005 | 4.75 | 4.60 | 4.45 | 4.40 | 4.35 | 3.65 |
| 5-Carboxylic acid-6-methoxy-benzotriazole | 1.627 | 1.708 | 4.25 | 3.95 | 3.48 | 3.25 | 2.88 | 0.29 |
| 5-Carboxylic acid-benzotriazole | 0.459 | 1.131 | 4.88 | 4.67 | 4.43 | 4.38 | 4.17 | 1.43 |
| 5-Nitro-benzotriazole | 0.018 | 3.927 | 4.80 | 4.73 | 4.40 | 4.28 | 4.02 | 1.68 |
| 5-Phenyl-benzotriazole | 0.015 | 0.007 | 4.33 | 4.30 | 4.20 | 4.20 | 4.20 | 3.35 |
| 5-Phenylthiol-benzotriazole | 0.024 | 3.952 | 3.73 | 3.50 | 3.33 | 3.20 | 3.15 | 1.63 |
| 5-Sulfonic acid-benzotriazole | 0.158 | 4.864 | 4.70 | 4.53 | 4.38 | 4.23 | 4.10 | 2.13 |

TABLE II

| INHIBITOR | Criteria 1 Avg. C.R. (mpy) 0–18 hrs <0.3 mpy) | Criteria 2 Avg. C.R. (mpy) 18–40 hrs <2.5 mpy | Criteria 3 Free Cl2 @ 19th hr >4 ppm | Criteria 4 Free Cl2 @ 40th hr >2 ppm | Halogen Resistant Corrosion Inhibitor |
|---|---|---|---|---|---|
| Blank | fail | fail | pass | fail | fail |
| Benzotriazole | pass | fail | pass | pass | fail |
| Tolyltriazole | pass | fail | pass | pass | fail |
| 2-(5-Amino-pentyl)-benzotriazole | pass | fail | fail | fail | fail |
| 2-Amino-5-chloro-benzoxazole | pass | pass | fail | fail | fail |
| 2-Butyl-5,6-dichloro-benzimidazole | pass | fail | pass | pass | fail |
| 2-Methyl-5,6-(methylenedioxy)-benzimidazole | pass | pass | fail | fail | fail |
| 4,5,6,7-Tetramethyl-benzotriazole | pass | pass | fail | fail | fail |
| 4,7-Dimethyl-benzotriazole | pass | fail | pass | fail | fail |
| 4-Sulfonic acid-benzotriazole | pass | fail | pass | pass | fail |
| 5,6-Benzo-benzotriazole | pass | fail | pass | fail | fail |
| 5,6-Dichloro-2-methyl-benzimidazole | pass | fail | pass | fail | fail |
| 5,6-Dichloro-4,7-dimethyl-benzotriazole | pass | fail | pass | fail | fail |
| 5,6-Dichloro-benzimidazole | pass | fail | pass | pass | fail |
| 5,6-Dimethyl-benzotriazole | pass | pass | pass | pass | pass |
| 5,6-Diphenyl-benzotriazole | pass | pass | pass | pass | pass |
| 5-Benzoyl-benzotriazole | pass | pass | pass | pass | pass |
| 5-Benzyl-benzotriazole | pass | pass | pass | pass | pass |
| 5-Carboxylic acid-6-methoxy-benzotriazole | fail | pass | pass | fail | fail |
| 5-Carboxylic acid-benzotriazole | fail | pass | pass | fail | fail |
| 5-Nitro-benzotriazole | pass | fail | pass | fail | fail |
| 5-Phenyl-benzotriazole | pass | pass | pass | pass | pass |
| 5-Phenylthiol-benzotriazole | pass | fail | fail | fail | fail |
| 5-Sulfonic acid-benzotriazole | pass | fail | pass | pass | fail |

EXAMPLE 2

Selected materials from the BCTA testing above were also tested using a Bench Top Recirculating Unit (BTU). The BTU is designed to measure the ability of a treatment to prevent corrosion and scale formation. The treated water is circulated through a by-pass rack, into which corrosion coupons and probes are inserted and passes through a heat exchange tube contained in a Plexiglass® (a trademark of Rohm & Haas) block. The heat exchanger is fitted with an electrical heater so that the heat load on the exchanger tube can be varied and controlled in the 0 to 11,000 BTU/ft.$^2$/hr. range. The velocity of water passing through the unit can be controlled in the range of 0 to 4.6 ft./sec. corrosion rates were obtained using linear polarization resistance measurement. Stainless steel probes were used as counter electrode and reference electrode.

The test water consisted of 500 ppm Ca as (CaCO$_3$), 250 ppm Mg (as CaCO$_3$), 354 ppm chloride, and 240 ppm sulfate. The pH was controlled at 7.2 by adding sulfuric acid, with the targeted M alkalinity being about 25 ppm as CaCO$_3$. In addition to the materials being tested for copper corrosion inhibition, the following treatments were also used: 15 ppm ortho-PO$_4$ (as PO$_4$), 3 ppm P$_2$O$_7$ (as PO$_4$) and 10 ppm HPS-I (a copolymer of acrylic acid and alkylhydroxypropyl sulfonate ether sodium salt).

The tested metallurgy included a copper probe, 3 copper coupons, a low carbon steel probe, 3 low carbon steel coupons, and a copper heat exchange tube. The water flow rate was controlled at 4 ft./sec., while the bulk water temperature was maintained at 120° F.

Metal samples were exposed under recirculating condition for 24 hours before continuous chlorination was started. Free chlorine concentration in the sump was maintained at 0.1–0.15 ppm using Oxidation Reduction Potential (ORP) control.

Materials tested in a BTU were tolyltriazole, 4,7-dimethylbenzotriazole and 5-benzylbenzotriazole. During the test 3 ppm of the treatment material was fed continuously. The testing metal samples were passivated without chlorination for 24 hours. Continuous chlorination was then started by continuously feeding bleach solutions. Results for copper and low carbon steel are shown in FIGS. 1, 2 and 3.

FIG. 1 shows low carbon steel and copper corrosion rates for a treatment comprising 3 ppm tolyltriazole. Low corrosion rates for both materials were observed in the first 24 hours without chlorine feed. Copper corrosion increase dramatically when chlorination began. This indicates that tolyltriazole copper corrosion efficacy decreases in the presence of chlorine. The low carbon steel corrosion rate increased significantly after the copper corrosion rate increased. This indicates that copper corrosion strongly effects low carbon steel corrosion inhibition.

FIG. 2 shows low carbon steel and copper corrosion rates for a treatment comprising 3 ppm 4,7-dimethylbenzotriazole. The results are similar to the FIG. 1 results for tolyltriazole.

FIG. 3 shows low carbon steel and copper corrosion rates for a treatment comprising 5-benzylbenzotriazole at 3 ppm. The corrosion rates show a dramatic lack of change after chlorination.

The results summarized in FIGS. 1, 2 and 3 show that the characteristics of corrosion inhibition affect determined in the Beaker Corrosion Tests are consistent with those observed in a simulated, flowing water, heat transfer system.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. Corrosion inhibitors for copper surfaces contacted by an aqueous system being treated with an oxidizing halogen biocide, consisting essentially of non-halogenated, nitrogen containing, aromatic compounds which:

a) exhibit an 18 hour coverage corrosion rate for copper of less than about 0.3 mpy in said aqueous system in the absence of halogen; and b) exhibit a 22 hour average corrosion rate for copper of less than about 2.5 mpy in said aqueous system after treatment with about 5 ppm of halogen; and c) exhibit a free chlorine concentration, in said aqueous system, of at least about 4.0 ppm of 19 hours after said aqueous system is treated with about 5 ppm chlorine; and d) exhibit a free chlorine concentration, in said aqueous system, of at least about 2.0 ppm at 40 hours after said aqueous system is treated with about 5 ppm chlorine.

2. Corrosion inhibitors for copper surfaces contacted by an aqueous system being treated with an oxidizing halogen biocide, consisting essentially of non-halogenated, substituted benzotriazoles which:

a) exhibit an 18 hour coverage corrosion rate for copper of less than about 0.3 mpy in said aqueous system in the absence of halogen; and b) exhibit a 22 hour average corrosion rate for copper of less than about 2.5 mpy in said aqueous system after treatment with about 5 ppm of halogen; and c) exhibit a free chlorine concentration, in said aqueous system, of at least about 4.0 ppm of 19 hours after said aqueous system is treated with about 5 ppm chlorine; and d) exhibit a free chlorine concentration, in said aqueous system, of at least about 2.0 ppm at 40 hours after said aqueous system is treated with about 5 ppm chlorine.

* * * * *